ent Number: 4,736,325
Date of Patent: Apr. 5, 1988

United States Patent [19]
Nagae et al.

[54] METHOD AND APPARATUS FOR SEARCHING FOR A FIDUCIAL POINT OF MACHINING RELATING TO C-AXIS

[75] Inventors: Akimitsu Nagae, Kasugai; Toshihiko Inoue, Komaki; Kimimasa Ishiguro, Aichi, all of Japan

[73] Assignee: Yamazaki Machinery Works, Ltd., Niwa, Japan

[21] Appl. No.: 847,316

[22] Filed: Apr. 2, 1986

[30] Foreign Application Priority Data

Apr. 5, 1985 [JP] Japan .................................. 60-73304

[51] Int. Cl.⁴ ............................................. G06F 15/00
[52] U.S. Cl. ................................. 364/474; 82/DIG. 8; 364/507; 364/559
[58] Field of Search ............... 364/474, 475, 560, 559, 364/507, 167-171; 82/DIG. 8

[56] References Cited

U.S. PATENT DOCUMENTS 3,532,863  10/1970  Enslein et al. ....................... 364/507

Primary Examiner—Jerry Smith
Assistant Examiner—Allen MacDonald
Attorney, Agent, or Firm—Cushman, Darby & Cushman

[57] ABSTRACT

A method of and apparatus for searching for a fiducial point of machining in relation to the C-axis in a lathe capable of carrying out machining by C-axis control based on the C-axis origin. In a machining work applied to a workpiece having a C-axis-value-prescribed configuration whose C-axis value in relation to the fiducial point of machining is prescribed by a first angle, and second and third angles between the C-axis origin and each point of measurement located on the opposite sides of the C-axis-value-prescribed configuration facing the C-axis are measured, the angle between the fiducial point of machining and the C-axis origin is obtained on the basis of the second and third angles measured and the first angle prescribed between the C-axis-value-prescribed configuration and the fiducial point of machining, thus detecting the fiducial point of machining with respect to the workpiece having the C-axis-value-prescribed configuration.

12 Claims, 7 Drawing Sheets

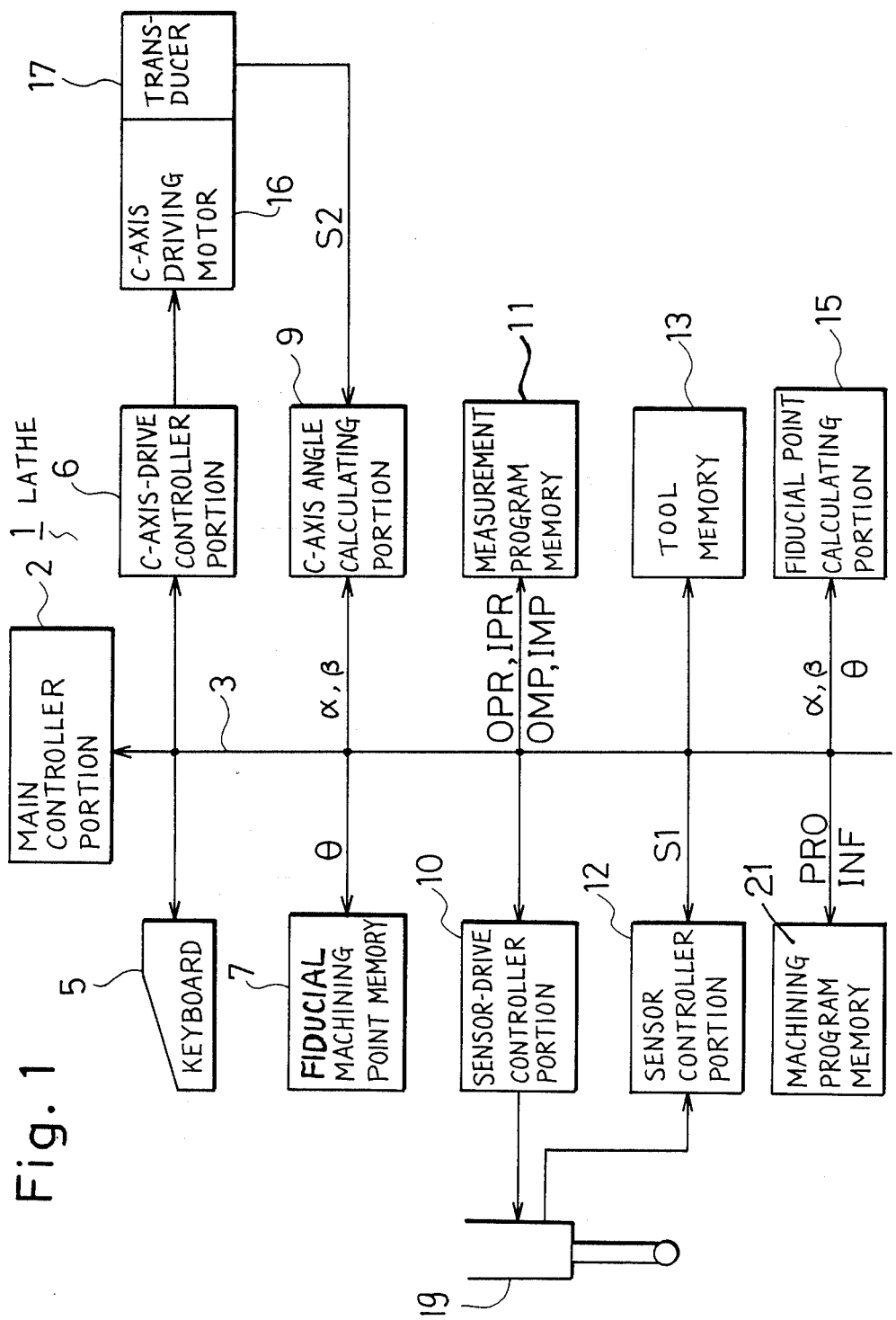

| STEP NUMBER | AXIS | DIRECTION | FEEDING |
|---|---|---|---|
| 1 | C | + | MEASUREMENT |
| 2 | C | − | MEASUREMENT |
| 3 | X | + | HIGH-SPEED |
| 4 | C | + | HIGH-SPEED |
| 5 | X | − | HIGH-SPEED |
| 6 | C | − | MEASUREMENT |
| 7 | C | + | MEASUREMENT |
| 8 | X | + | HIGH-SPEED |

OMP

IMP

| STEP NUMBER | AXIS | DIRECTION | FEEDING |
|---|---|---|---|
| 1 | C | + | MEASUREMENT |
| 2 | C | − | MEASUREMENT |
| 3 | Z | − | HIGH-SPEED |
| 4 | C | + | HIGH-SPEED |
| 5 | Z | + | HIGH-SPEED |
| 6 | C | − | MEASUREMENT |
| 7 | C | + | MEASUREMENT |
| 8 | Z | − | HIGH-SPEED |

METHOD AND APPARATUS FOR SEARCHING FOR A FIDUCIAL POINT OF MACHINING RELATING TO C-AXIS

BACKGROUND OF THE INVENTION

The present invention relates to a method of and apparatus for searching a fiducial point of machining in a lathe which has a C-axis control function enabling control of the rotational speed and angle of the spindle during the time of machining.

To date, when an axially asymmetric workpiece having a protuberance or a dent located on its inner or outer circumference or on its end surface and prescribed by the angle defined between this and the fiducial point of machining in the direction toward the C-axis is machined by such a lathe, it is necessary for the fiducial point of machining prescribed in the machining program to be accurately set in relation to the C-axis origin which is assumed to be an criterion of the C-axis control. For this reason, specific jigs and the like have been used in such a lathe.

However, according to this method, various jigs have to be prepared in accordance with each kind of workpiece to be machined. This is inconvenient in the light of the recent tendency to manufacture goods in small amounts and in many variaties. If such jigs are not used, the step of setting up workpieces becomes time-consuming and cannot be carried out with high accuracy. The conventional method is thus disadvantageous.

SUMMARY OF THE INVENTION

For the purpose of eliminating the above defects, the present invention aims to provide a method of and apparatus for searching for a fiducial point of machining in relation to the C-axis. The method described enables easy detection of the fiducial point of machining with respect to a workpiece having a C-axis-value-prescribed configuration given by a prescribed angle made between the C-axis-value-prescribed configuration and the fiducial point of machining, and the method enables a machining involving C-axis control such as milling work to be carried out on such a workpiece in the manner wherein accurate positioning is maintained in relation to the C-axis-value-prescribed configuration.

In other words, when a machining of a workpiece having a C-axis-value-prescribed configuration whose C-axis value in relation to the fiducial point of machining is prescribed by an angle is carried out on the basis of the C-axis control, angles defined between the C-axis origin and each of the points of measurement located on the opposite sides of the C-axis-value-prescribed configuration facing the C-axis are measured. On the basis of the angles thereby measured and the prescribed angle defined between the C-axis-value-prescribed configuration and the fiducial point of machining, the angle between the fiducial point of machining and the C-axis origin is obtained. The method of searching according to the present invention is thus constituted.

On the other hand, a searching apparatus according to the present invention comprises: a machining program storing means for storing a machining program relating to a workpiece having a C-axis-value-prescribed configuration whose C-axis value in relation to the fiducial point of machining is prescribed by an angle; an angle measuring means for measuring angles defined between the C-axis origin and each of the points of measurement located on the opposite sides of the C-axis-value-prescribed configuration of the workpiece facing the C-axis; and an angle calculating means for obtaining an angle defined between the fiducial point of machining and the C-axis origin from the angles measured by the angle measuring means and the prescribed angle defined between the C-axis-value-prescribed configuration and the fiducial point of machining.

According to the present invention, by providing the above arrangements, the angles between the C-axis origin and each of the points of measurement located on the opposite sides of the C-axis-value-prescribed configuration of the workpiece facing the C-axis are measured, and the angle between the fiducial point of machining and the C-axis origin is thereby obtained so as to detect the point of the fiducial point of machining.

According to the present invention, a fiducial point of machining can be readily detected with respect to a workpiece having a C-axis-value-prescribed configuration, and a machining work involving C-axis control, such as milling work, can be carried out on such a workpiece without using any jigs yet at the same time maintaining accurate positioning in relation to the C-axis-value-prescribed configuration.

BRIEF DESCRIPTION OF THE DRAWINGS

FIG. 1 is a control block diagram of an example of a lathe to which the present invention is applied;

DESCRIPTION OF THE PREFERRED EMBODIMENT

Figure 3:
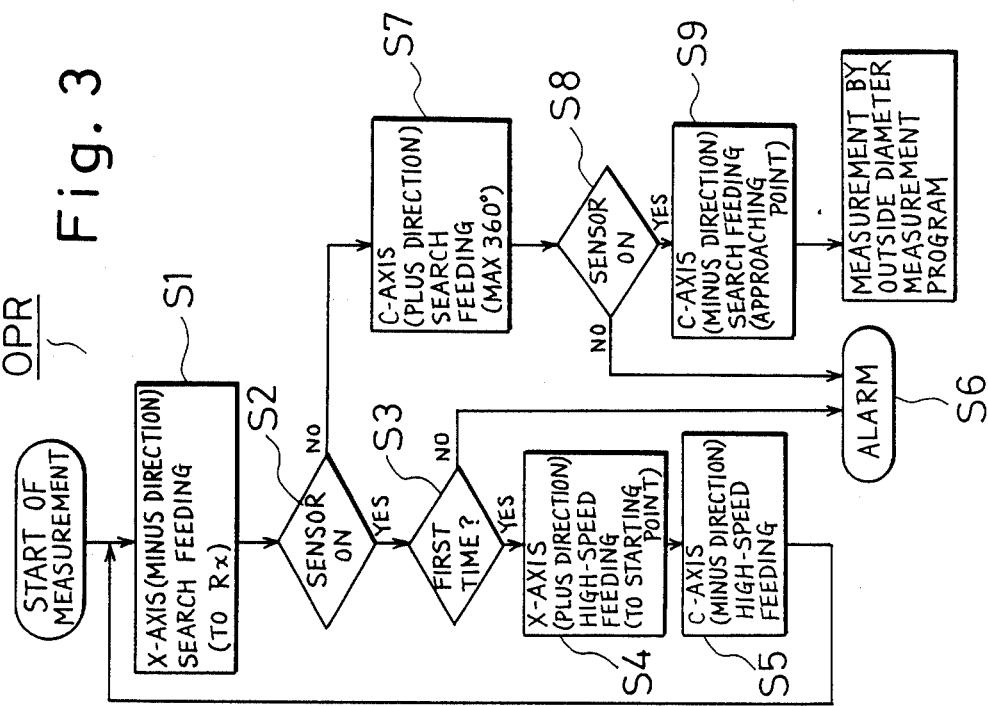
FIG. 3 is a flowchart of an example of an outside diameter searching program.

A lathe 1 having a function of C-axis control includes, as shown in FIG. 1, a main controller portion 2 to which, through a bus-line 3, are connected a keyboard 5, a C-axis-drive controller portion 6, a fiducial machining point memory 7, a C-axis angle calculating portion 9, a sensor-drive controller portion 10, a measurement program memory 11, a sensor controller portion 12, a tool memory 13, a fiducial point calculating portion 15, a machining program memory 21, etc. A C-axis driving motor 16 is connected to the C-axis-drive controller portion 6 and has a transducer 17 which is adapted to detect the angle of rotation of the C-axis driving motor 16 and which is connected to the C-axis angle calculating portion 9. A contact-type sensor 19 is connected to the sensor-drive controller portion 10 so as to be movably driven by the same. The sensor 19 is also connected to the sensor controller portion 12.

Figure 2:
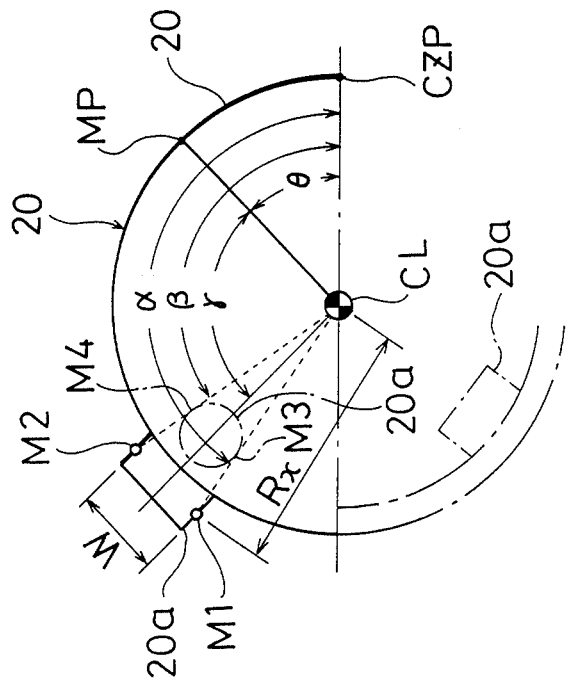
FIG. 2 is a front view showing the relationship between the C-axis origin, the fiducial point of machining and a C-axis-value-prescribed configuration with respect to a workpiece.

As shown in FIG. 2, a workpiece 20 in the form of a general cylinder is detachably held by a chuck means (not shown) at the spindle of the lathe which is rotatably driven by the C-axis driving motor 16. At the outer circumference of the workpiece 20 is formed a seating portion 20a which projects outwardly.

According to the above arrangement which is mainly for the lathe 1, when working on the workpiece 20, the main controller portion 2 reads a machining program PRO corresponding to the objective workpiece 20 from the machining program memory 21 and carries out the prescribed machining. When a milling work etc. involving C-axis control is prescribed with the criterion of a fiducial point of machining MP of the workpiece in the machining program PRO, the machining can be started at any portion of the workpiece 20 if the workpiece 20 is axially symmetrical. If the workpiece 20 has a protuberance comprising the seating portion 20a as shown in FIG. 2 and if an angle $\gamma$ is previously given as a C-axis value to such a protuberance in relation to the fiducial point of machining MP (a configuration having a prescribed C-axis value of this kind is hereinafter referred to as "a C-axis-value-prescribed configuration"), the machining involving C-axis control in relation to the C-axis-value-prescribed configuration (seating portion 20a) cannot be carried out in a suitable manner without detecting the angle $\theta$ made between the fiducial point of machining MP and the C-axis origin CZP on which the C-axis control is based (that is, the C-axis-value-prescribed configuration and a configuration formed by milling are bound together in terms of the relationship of their positions with the fiducial point of machining interposed there between).

Then, if the angle $\gamma$ has been prescribed in the machining program PRO as the C-axis value defined between the seating portion 20a and the fiducial point of machining MP, the main controller portion 2 immediately starts the motion of searching for the fiducial point of machining MP. When the C-axis value between the C-axis-value-prescribed configuration and the fiducial point of machining MP is ordered in the machining program PRO, the machining program PRO orders various measurement data INF for measuring the angular position of the C-axis-value-prescribed configuration in addition to the angle $\gamma$. This measurement data INF consists of position data indicating whether the C-axis-value-prescribed configuration is located at the outer circumference of the workpiece 20 or located at the end surface or inside diametral portion of the same, coordinates corresponding to the starting point of measurement of the sensor 19, the distance Rx between each point of measurement M1 and M2 and the center of rotation CL (Z-axis) in a direction at right angles thereto (namely, in the direction of the X-axis) or the distance Rz between the end surface of the workpiece and each point of measurement M3 and M4 in the direction of the z-axis, a width W of the C-axis-value-prescribed configuration, type prescribing data on the sensor 19 used in measurement, etc. The main controller portion 2 reads such INF data from the machining program PRO and reads, from the measurement program memory 11, a measurement program corresponding to the location of the C-axis-value-prescribed configuration prescribed in the measurement data INF.

If, in the measurement data INF, the location of the C-axis-value-prescribed configuration prescribed is located on the outer circumference of the workpiece 20, the main controller portion 2 reads an outside diameter searching program OPR from the measurement program memory 11 and obtains, on the basis of this outside diameter searching program OPR, the angle $\theta$ made between the fiducial point of machining MP and the C-axis origin CZP by obtaining an angular position of the C-axis-value-prescribed configuration in relation to the C-axis origin CZP. As shown in FIG. 2, the seating portion 20a, which is the C-axis-value-prescribed configuration, is measured by the sensor 19 so as to obtain, in relation to the C-axis origin CZP, angular positions $\alpha$ and $\beta$ of the opposite sides of the seating portion 20a facing the C-axis. On the basis of the values thereby measured, the angle $\theta$ made between the fiducial point of machining MP and the C-axis origin CZP is obtained by the formula:

$$\theta = \frac{\alpha + \beta}{2} - \gamma \qquad (1)$$

Figure 4:
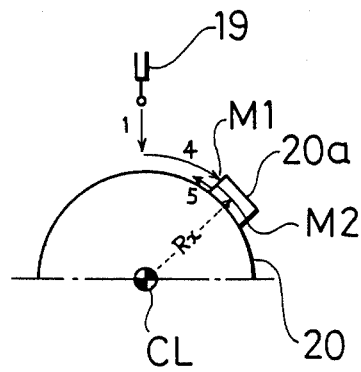
FIGS. 4 and 5 are process diagrams showing the state of searching at the outer circumference of the workpiece having the C-axis-value-prescribed configuration.
Figure 5:
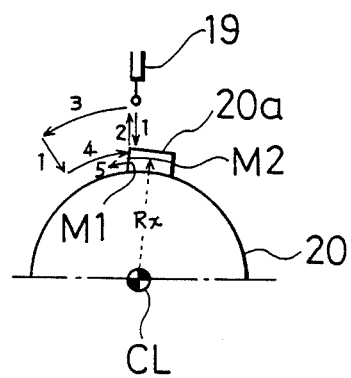
Figure 6:
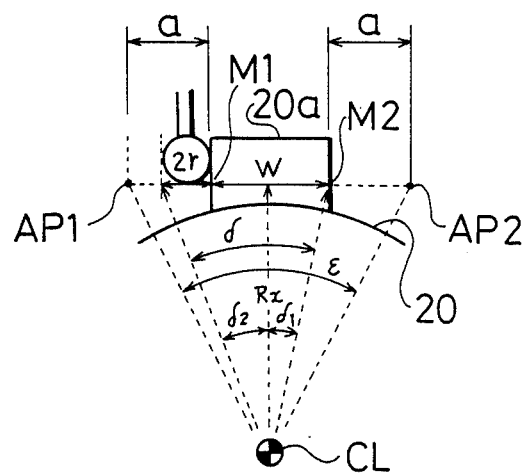
FIG. 6 is a grossly enlarged diagram enabling calculation of the degree of movement of the C-axis in measurement of the outer circumference.

As shown in FIG. 3, at the step S1, the main controller portion 2 positions, on the basis of the outside diameter searching program OPR, the sensor 19 through the medium of the sensor-drive controller portion 10 at the starting point of measurement prescribed by the measurement data INF in the machining program PRO. Then, the main controller portion 2 moves the sensor 19 in the downward direction as viewed in FIG. 4, that is, in the direction of minus on the X-axis, so as to lead the sensor 19 to a coordinate point which is prescribed in the measurement data INF and is defined by the distance Rx from the Z-axis, namely, the spindle (the step indicated by numerals 1 in FIGS. 4 and 5). If, at this step, the C-axis-value-prescribed configuration is accidentally located beneath the sensor 19, as shown in FIG. 5, the sensor 19 contacts the seating portion 20a before it reaches to the point of distance Rx, so that it is turned on and a detection signal S1 is fed to the main controller portion 2 through the sensor controller portion 12. The main controller portion 2 then proceeds from the step S2 to the step S3 so as to judge whether this detection of the seating portion 20a is the initial detection or not. If it is in fact the initial detection, the main controller portion 2 proceeds to the step S4 so as to return the sensor 19 by high-speed feeding through the medium of the sensor-drive controller portion 10 in the upward direction as viewed in FIG. 5, that is, in the direction of plus on the X-axis, to the position it was in before the start of measurement (the step indicated by a numeral 2 in FIG. 5). The main controller portion 2 then proceeds to the step S5 in which it rotates the C-axis driving motor 16 by a given angle in the direction of minus, that is, in the clockwise direction through the medium of the C-axis-drive controller portion 6 so as to evacuate the seating portion 20a from the underside of the sensor 19 (the step indicated by a numeral 3 in FIG. 5). The angle of rotation $\delta$ of the C-axis at this time is obtained from, as shown in FIG. 6, the width W of the C-axis-value-prescribed configuration in the measurement data INF, the distance Rx of the point of measurement in the direction of the X-axis, and the diameter 2r of the detecting portion of the sensor 19 previously stored in the tool memory 13, and by the formula:

$$\delta = \delta_1 + \delta_2 = \tan^{-1}\frac{W}{2Rx} + \tan^{-1}\frac{W + 4r}{2Rx} \quad (2)$$

After the C-axis-value-prescribed configuration is evacuated from the position beneath the sensor 19 at the step S5, the step S1 is carried out for the second time so as to move the sensor 19 to the position of distance Rx in the direction of minus on the X-axis. If, at this time, the sensor 19 is again turned on and the detection signal S1 in FIG. 1 is fed to the main controller portion 2 through the sensor controller portion 12 before it reaches the point of distance Rx the main controller portion 2 judges, at the step S3, that the setting of the distance Rx etc. prescribed in the measurement data INF includes errors. Since this output signal S1 is secondary, the main controller portion 2 proceeds to the step S6 so as to carry out an alarm indication in a given manner to the operator etc. through the medium of an alarming means (not shown).

On the other hand, whether the C-axis-value-prescribed configuration is evacuated or not, after the sensor 19 reaches the measuring point coordinates ordered in the measurement data INF at the step S1 in FIG. 3, step S7 is carried out. At step S7, the main controller portion 2 drives the C-axis driving motor 16 through the medium of the C-axis-drive controller portion 6 so as to rotate the C-axis in the counterclockwise direction (in the direction of plus), as viewed in FIGS. 4 and 5, until the detection signal S1 of FIG. 1 is output from the sensor 19 at step S8 (the step indicated by numerals 4 in FIGS. 4 and 5). If the detection signal S1 is not output from the sensor 19 after the rotation of the C-axis by the maximum angle of 360°, the main controller portion 2 judges the setting of the distance Rx and the Z coordinates of the starting point of measurement in the measurement data INF to include errors, and it proceeds to step S6 and alarms. Since the rotational speed of the C-axis is set so as to be sufficient to measure the general location of the C-axis-value-prescribed configuration, the C-axis is rotated at a search feeding speed higher than that in ordinary measurement operation and lower than that of the high-speed feeding.

As the C-axis is rotated in the direction of plus, the sensor 19 contacts the C-axis-value-prescribed configuration, and the detection signal S1 of FIG. 1 is output from the sensor 19 through the sensor controller portion 12. Then, at step S9 of FIG. 3, the main controller portion 2 rotates the C-axis by a given angle in the direction of minus opposite to that assumed herein, so as to move the sensor 19 to a given approaching point AP1 and to release the state of contact between the tip of the sensor 19 and the C-axis-value-prescribed configuration. The main controller portion 2 then starts a measurement operation on the basis of the next outer circumference measurement program OMP.

Figures 7, 8:
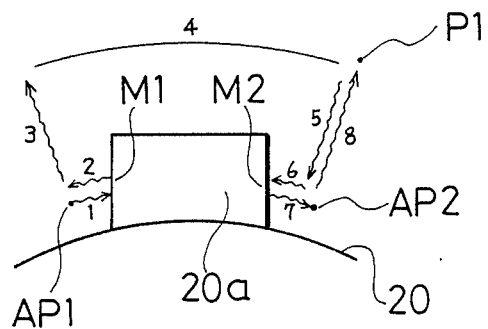
FIG. 7 is a diagram showing the measurement steps of in an outer circumference measurement program.
FIG. 8 is a grossly enlarged diagram showing the state of measurement carried out by the outer circumference measurement program.

The main controller portion 2 reads the outer circumference measurement program OMP from the measurement program memory 11 and immediately starts the measurement operation whose operation steps are such as shown in FIG. 7. FIG. 7 shows each step of the outer circumference measurement program OMP in the order of execution and of the step number. In the outer circumference measurement program OMP, at the step number 1, the C-axis is transferred in the direction of plus at a measurement feeding speed for measurement lower than that of the above search feeding, until the sensor 19 contacts the C-axis-value-prescribed configuration at the point of measurement M1 and the detection signal S1 of FIG. 1 is output (the step indicated by a numeral 1 in FIG. 8). After the detection signal S1 is output, the main controller portion 2 makes the C-axis angle calculating portion 9 calculate the angle α between the point of measurement M1 and the C-axis origin CZP on the basis of the signal of rotation S2 of FIG. 1 which is output from the transducer 17 mounted on the C-axis driving motor 16 at each given angle of rotation of the C-axis driving motor 16. The main controller portion 2 feeds the value of angle α thereby obtained to the fiducial point calculating portion 15. On the other hand, after the detection signal S1 from the sensor controller portion 12 is output, the C-axis-drive controller portion 6 immediately rotates the C-axis in the direction of minus by a given angle until the sensor 19 reaches to the approaching point AP1, so as to release the state of contact between the sensor 19 and the C-axis-value-prescribed configuration (the step indicated by a step number 2 in FIG. 7 and by a numeral 2 in FIG. 8).

After the state of contact between the sensor 19 and the C-axis-value-prescribed configuration is released, the main controller portion 2 moves the sensor 19 by high-speed feeding through a given distance in the direction of plus, namely, in the upward direction as viewed in FIG. 8, through the medium of the sensor-drive controller portion 10 (the step indicated by a step number 3 in FIG. 7 and by a numeral 3 in FIG. 8), and it rotates the C-axis in the direction of plus by a given angle by high-speed feeding so as to move the sensor 19 to a point P1 (the step indicated by a step number 4 in FIG. 7 and by a numeral 4 in FIG. 8). As shown in FIG. 6, the amount of angular movement ε at this time is obtained by the formula:

$$\epsilon = 2\tan^{-1}\frac{W + 2a}{2Rx} \quad (3)$$

where a represents the distance between the approaching points AP1 and AP2 and the points of measurement M1 and M2 of the C-axis-value-prescribed configuration.

After moved to the point P1 in this way, the sensor 19 is moved in the direction of minus on the X-axis by high-speed feeding so as to be positioned to the approaching point AP2 located at a given distance from the right side of the seating portion 20a of the C-axis-value-prescribed configuration, as viewed in FIG. 8 (the step indicated by a step number 5 in FIG. 7 and by a numeral 5 in FIG. 8). Then, as described above, the C-axis is driven and moved in the direction of minus at the speed of measurement feeding, until the sensor 19 contacts the point of measurement M2 and the detection signal S1 is output (the step indicated by a step number 6 in FIG. 7 and by a numeral 6 in FIG. 8). After the detection signal S1 of FIG. 1 is output, the angle β between the point of measurement M2 and the C-axis origin CZP is calculated by the C-axis angle calculating portion 9, and the angle β thereby obtained is output to the fiducial point calculating portion 15. On the other hand, after the detection signal S1 is output from the sensor controller portion 12, the C-axis-drive controller portion 6 immediately rotates the C-axis in the direction of plus by a given angle until the sensor 19 reaches to the approaching point AP2, so as to release the state of contact between the sensor 19 and the C-axis-value-prescribed configuration (the step indicated by a step number 7 in FIG. 7 and by a numeral 7 in FIG. 8).

After the state of contact between the sensor 19 and the C-axis-value-prescribed configuration is released, the main controller portion 2 moves the sensor 19 by high-speed feeding through a given distance in the direction of plus on the X-axis (in the upward direction as viewed in FIG. 8 to point P1), through the medium of the sensor-drive controller portion 10 (the step indicated by a step number 8 in FIG. 7 and by a numeral 8 in FIG. 8), and it finishes the measurement operation of the angles $\alpha$ and $\beta$ between the C-axis origin CZP and each point of measurement M1 and M2 of the C-axis-value-prescribed configuration carried out on the basis of the outer circumference measurement program OMP.

After the angles $\alpha$ and $\beta$ between each point of measurement M1 and M2 of the C-axis-value-prescribed configuration and the C-axis origin CZP are detected in this way, the fiducial point calculating portion 15 calculates the objective angle $\theta$ between the fiducial point of machining MP and the C-axis origin CZP by the formula (1) and stores the obtained value $\theta$ in the fiducial machining point memory 7. When the angle $\theta$ between the fiducial point of machining MP and the C-axis origin CZP is obtained, a machining such as milling work can be carried out while maintained in an exact positional relationship with the fiducial point of machining MP; that is, with the C-axis-value-prescribed configuration, as the C-axis is positioned, in such a milling work, with the criterion of the C-axis origin CZP by referring to the angle $\theta$ and to the angles prescribed in the machining program PRO on the basis of the fiducial point of machining MP.

Figure 9:
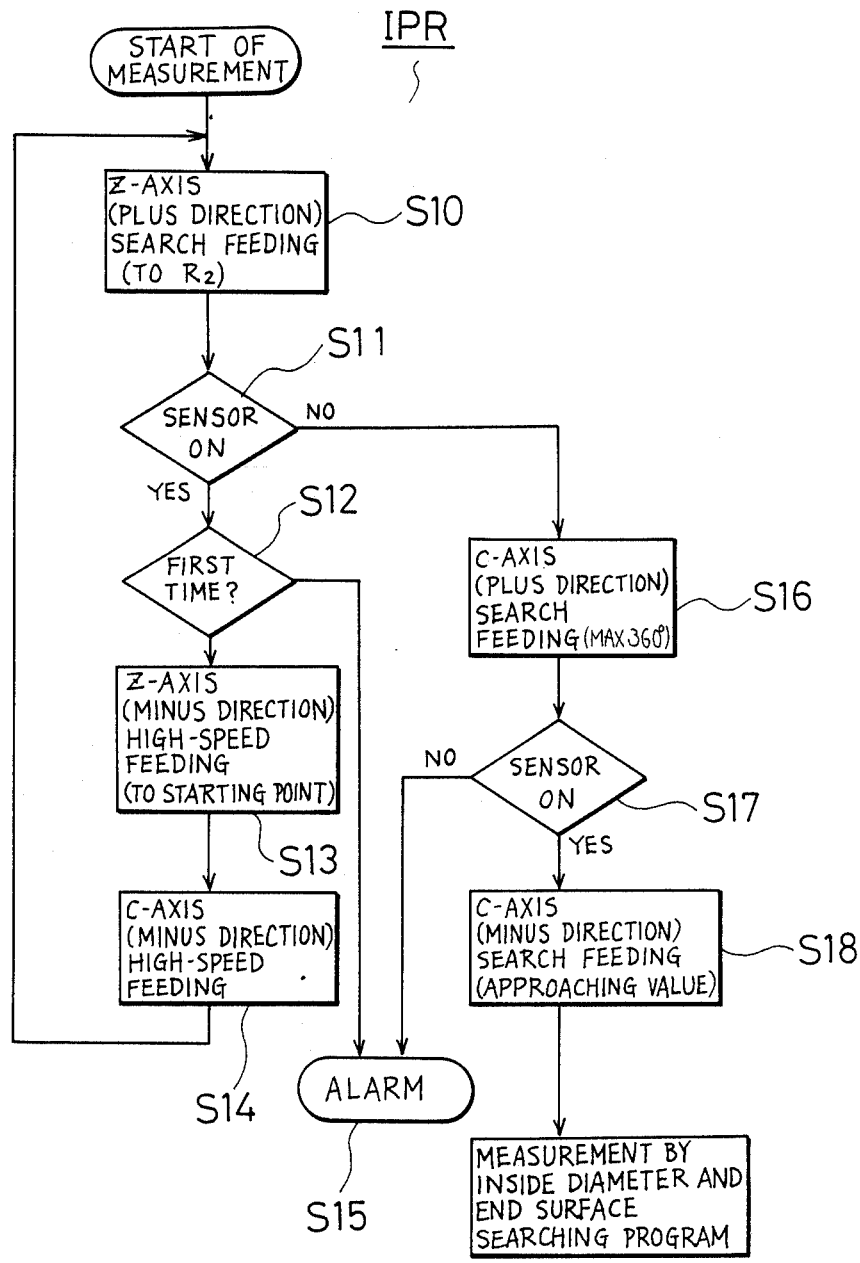
FIG. 9 is a flowchart of an example of an inside diameter and end surface searching program.

If, in the measurement data INF, the location of the C-axis-value-prescribed configuration is at the end surface or at the inner circumference of the workpiece 20, the main controller portion 2 reads an inside diameter and end surface searching program IPR from the measurement program memory 11 so as to obtain the angle $\theta$ between the fiducial point of machining MP and the C-axis origin CZP on the basis of the inside diameter and end surface searching program IPR which is shown in FIG. 9. In the measurement data INF for this inside diameter and end surface searching program IPR, it is necessary to input a value representing a distance Rz˙ between each point of measurement M3 and M4 and the end surface of the workpiece 20 in the direction of the Z-axis, instead of Rx which is used when the C-axis-value-prescribed configuration on the outer circumference is detected.

Figure 10:
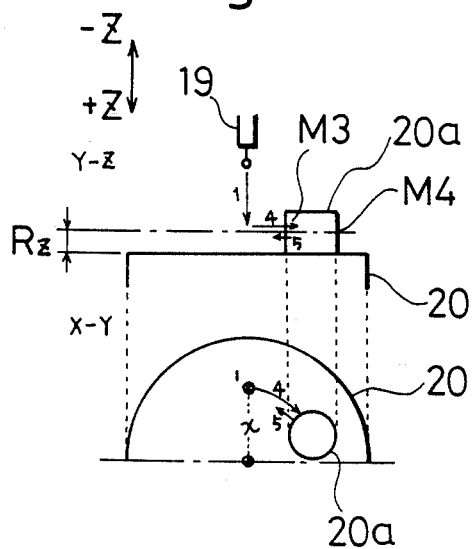
FIGS. 10 and 11 are process diagrams showing the state of searching at the end surface of the workpiece having the C-axis-value-prescribed configuration.
Figure 11:
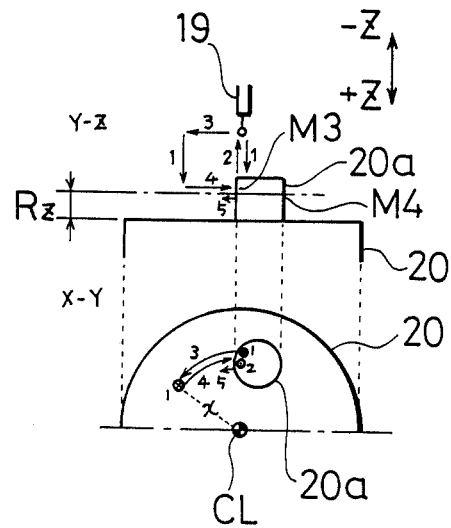
Figure 12:
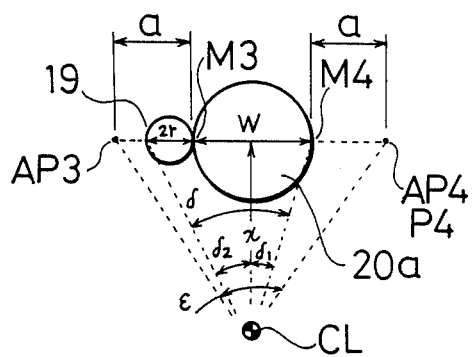
FIG. 12 is a grossly enlarged diagram enabling calculation of the degree of movement of the C-axis in measurement of the inside diameter and end surface.

On the basis of the inside diameter and end surface searching program IPR, as shown in FIG. 9 step 10, the main controller portion 2 positions the sensor 19, through the medium of the sensor-drive controller portion 10, at the measurement starting point prescribed in the measurement data INF. The controller portion 2 then moves the sensor 19 in the direction of plus on the Z-axis to a coordinate point corresponding to the distance Rz from the end surface of the workpiece 20 prescribed in the measurement data INF (the step indicated by numerals 1 in FIGS. 10 and 11). The description will be done hereinafter with respect to the case in which the C-axis-value-prescribed configuration is located on the end surface of the workpiece. However, if the C-axis-value-prescribed configuration is located at the inside diametral portion of the workpiece, as indicated by an alternate long and short dash line in FIG. 2, the similar approaching manner of the sensor 19 etc. is also applicable. If, at this time, the C-axis-value-prescribed configuration is accidentally located in front of the sensor 19, as shown in FIG. 11, the sensor 19 contacts the seating portion 20a and is turned on before it reaches the distance Rz, so that the detection signal 31 of FIG. 1 is fed to the main controller portion 2 through the sensor controller portion 12. The main controller portion 2 then proceeds from the step S11 to the step S12 and judges whether this detection of the seating portion 20a has been carried out for the first time or not. If the detection is judged to be carried out for the first time, the main controller portion 2 proceeds to the step S13 and returns the sensor 19 by high-speed feeding in the direction of minus on the Z-axis to the position it was in before the start of measurement through the medium of the sensor-drive controller portion 10 (the step indicated by numerals 2 in FIG. 11. The main controller position 2 then rotates, at the step S14, the C-axis driving motor 16 by a given angle in the direction of minus (in the clockwise direction) through the medium of the C-axis-drive controller portion 6 so as to evacuate the seating portion 20a from the front of the sensor 19 (the step indicated by numerals 3 in FIG. 11). The angle of rotation $\delta$ of the C-axis at this time is obtained from, as shown in FIG. 12, the width W of the C-axis-value-prescribed configuration in the measurement data INF, the distance x of the point of measurement from the Z-axis in the direction of X-axis, and the diameter 2r of the detecting portion of the sensor 19 previously stored in the tool memory 13, and by the formula:

$$\delta = \delta_1 + \delta_2 = \tan^{-1}\frac{W}{2x} + \tan^{-1}\frac{W + 4r}{2x} \qquad (4)$$

After the C-axis-value-prescribed configuration is evacuated from the position in front of the sensor 19 at the step S14, the step S10 is carried out for the second time so as to move the sensor 19 to the position of distance Rz in the direction of plus on the Z-axis. If, during this movement of the sensor 19 to the position defined by the distance Rz, the sensor 19 is again turned on, the detection signal S1 is fed to the main controller portion 2 through the sensor controller portion 12, and the main controller portion 2 judges, at the step S12, that the setting of the distance Rz etc. in the measurement data INF includes errors. Since this output signal S1 is secondary, the main controller portion 2 proceeds to the step S15 so as to carry out an alarm indication in a given manner to the operator and the like by the medium of an alarming means (not shown).

On the other hand, whether the C-axis-value-prescribed configuration is evacuated or not, after the sensor 19 reaches the measuring point coordinates ordered in the measurement data INF at step S10, step S16 is carried out. At step S16, the main controller portion 2 drives the C-axis driving motor 16 by the medium of the C-axis-drive controller portion 6 so as to rotate the C-axis in the counterclockwise direction in plains X - Y in FIGS. 10 and 11 until the detection signal S1 is output from the sensor 19 at the step S17 (the step indicated by numerals 4 in FIGS. 10 and 11). If the detection signal S1 is not output from the sensor 19 after the rotation of the C-axis by the maximum angle of 360°, the main controller portion 2 judges the setting of the distance Rz and the X coordinates of the starting point of measurement in the measurement data INF to include errors, and it proceeds to step S15 and alarms. Since the rotational speed of the C-axis is set to be sufficient to measure the general location of the C-axis-value-prescribed configuration, the C-axis is rotated at a search feeding speed higher than that in ordinary measurement operation and lower than that of the high-speed feeding.

As the C-axis is rotated in the direction of plus, the sensor 19 contacts the C-axis-value-prescribed configuration, and the detection signal S1 is output from the sensor 19 through the sensor controller portion 12. Then, at the step S18, the main controller portion 2 rotates the C-axis by a given angle in the direction of minus opposite to that assumed herein, so as to move the sensor 19 to a given approaching point AP3 and to release the state of contact between the tip of the sensor 19 and the C-axis-value-prescribed configuration, and it starts a measurement operation on the basis of the next inside diameter and end surface searching program IMP.

Figures 13, 14:
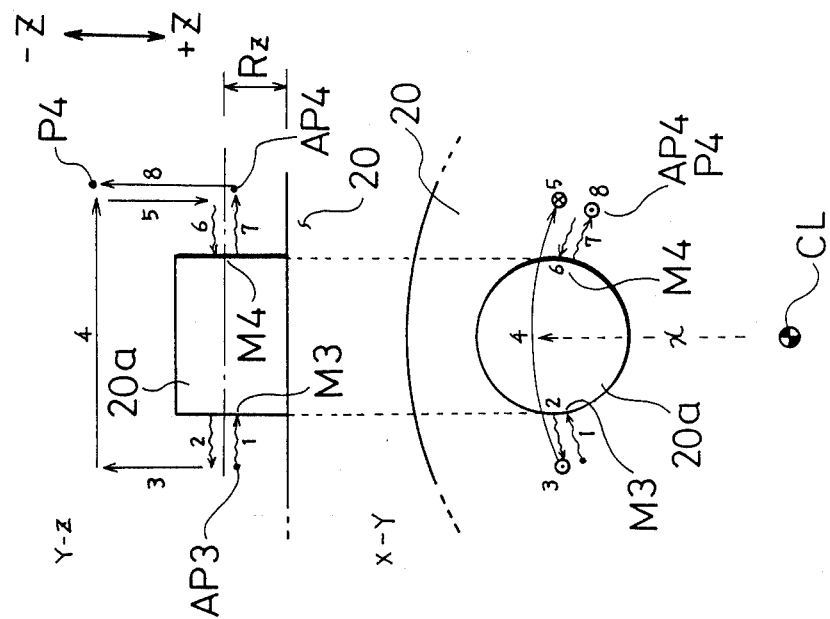
FIG. 13 is a diagram showing the measurement steps in the inside diameter and end surface measurement program.
FIG. 14 is a grossly enlarged diagram showing the state of measurement carried out by the inside diameter and end surface measuring program.

The main controller portion 2 reads the inside diameter and end surface searching program IMP from the measurement program memory 11 and immediately starts the measurement operation whose operation steps are such as shown in FIG. 13. FIG. 13 shows each step of the inside diameter and end surface searching program IMP in the order of execution and of the step number. In the inside diameter and end surface searching program IMP, at the step number 1, the C-axis is transferred in the direction of plus at a speed of measurement feeding for measurement lower than that of the above search feeding, until the sensor 19 contacts the C-axis-value-prescribed configuration at the point of measurement M3 after moved from the approaching point AP3 and the detection signal S1 is output (the step indicated by a numeral 1 in FIG. 14). After the detection signal S1 is output, the main controller portion 2 makes the C-axis angle calculating portion 9 calculate the angle $\alpha$ between the point of measurement M3 and the C-axis origin CZP, and it feeds the value of angle $\alpha$ thereby obtained to the fiducial point calculating portion 15. On the other hand, after the detection signal S1 from the sensor controller portion 12 is output, the C-axis-drive controller portion 6 immediately rotates the C-axis in the direction of minus by a given angle until the sensor 19 reaches to the approaching point AP3, so as to release the state of contact between the sensor 19 and the C-axis-value-prescribed configuration (the step indicated by a step number 2 in FIG. 13 and by a numeral 2 in FIG. 14).

After the state of contact between the sensor 19 and the C-axis-value-prescribed configuration is released, the main controller portion 2 moves the sensor 19 by high-speed feeding through a given distance in the direction of minus on the Z-axis through the medium of the sensor-drive controller portion 10 (the step indicated by a step number 3 in FIG. 13 and by a numeral 3 in FIG. 14), and it rotates the C-axis in the direction of plus by a given angle by high-speed feeding so as to move the sensor 19 to a point P4 (the step indicated by a step number 4 in FIG. 13 and by a numeral 4 in FIG. 14). As shown in FIG. 12, the amount of angular movement $\epsilon$ of the C-axis at this time is obtained by the formula:

$$\epsilon = 2\tan^{-1}\frac{W + 2a}{2x} \quad (5)$$

where $a$ represents the distance between the approaching points AP3 and AP4 and the points of measurement M3 and M4 of the C-axis-value-prescribed configuration.

After being moved to the point P4 in this way, the sensor 19 is moved in the direction of plus on the Z-axis by high-speed feeding so as to be positioned to the approaching point AP4 located at a given distance from the right side of the seating portion 20a of the C-axis-value-prescribed configuration, as viewed in FIG. 14 (the step indicated by a step number 5 in FIG. 13 and by a numeral 5 in FIG. 14). Then, as described above, the C-axis is driven and moved in the direction of minus at the speed of measurement feeding, until the sensor 19 contacts the point of measurement M4 and the detection signal S1 is output (the step indicated by a step number 6 in FIG. 13 and by a numeral 6 in FIG. 14). After the detection signal S1 is output, the angle $\beta$ between the point of measurement M4 and the C-axis origin CZP is calculated by the C-axis angle calculating portion 9, and the angle $\beta$ thereby obtained is output to the fiducial point calculating portion 15. On the other hand, after the detection signal S1 is output from the sensor controller portion 12, the C-axis-drive controller portion 6 immediately rotates the C-axis in the direction of plus by a given angle so as to release the state of contact between the sensor 19 and the C-axis-value-prescribed configuration (the step indicated by a step number 7 in FIG. 13 and by a numeral 7 in FIG. 14).

After the state of contact between the sensor 19 and the C-axis-value-prescribed configuration is released, the main controller portion 2 moves the sensor 19 by high-speed feeding in the direction of minus on the Z-axis through a given distance to the point P4 through the medium of the sensor-drive controller portion 10 (the step indicated by a step number 8 in FIG. 13 and by a numeral 8 in FIG. 14), and it finishes the measurement operation of the angles $\alpha$ and $\beta$ between the C-axis origin CZP and each point of measurement M3 and M4 of the C-axis-value-prescribed configuration carried out on the basis of the inside diameter and end surface searching program IMP.

After the angles $\alpha$ and $\beta$ between each point of measurement M3 and M4 of the C-axis-value-prescribed configuration and the C-axis origin CZP are detected in this way, the fiducial point calculating portion 15 calculates the objective angle $\theta$ between the fiducial point of machining MP and the C-axis origin CZP by the formula (1) and stores the obtained value $\theta$ in the fiducial machining point memory 7. When the angle $\theta$ between the fiducial point of machining MP and the C-axis origin CZP is obtained, a machining such as milling work can be carried out while maintained in an exact positional relationship with the fiducial point of machining MP; that is, with the C-axis-value-prescribed configuration, as the C-axis is positioned, in such a milling work, with the criterion of the C-axis origin CZP by referring to the angle $\theta$ and to the angles prescribed on the basis of the fiducial point of machining MP.

The present invention has been specifically described by referring to these preferred embodiments, but, in this specification, the embodiments employed are illustrative and not restrictive. The scope of the invention is specified in the appended claims and is not narrowed by the description relating to the embodiments. Therefore, the present invention includes all modifications and alterations made in accordance with the appended claims.

What is claimed is:

1. A method of searching for a fiducial point of machining in relation to a C-axis origin in a lathe applied to a workpiece having a C-axis-value-prescribed configuration whose C-axis value prescribed configuration position in relation to the fiducial point of machining is prescribed by a first angle, said method comprising the steps of:
   moving a sensor until it reaches a prescribed measuring point;
   rotating a workpiece until a first side of the C-axis value prescribed configuration contacts said sensor;
   measuring a second angle, facing the C-axis origin, between the C-axis origin and a first sensor contacting point of measurement on the first side of the C-axis-value prescribed configuration;
   moving said sensor until it reaches a second prescribed measuring point;
   rotating the workpiece until a second side of the C-axis value prescribed configuration contacts said sensor;
   measuring a third angle, facing the C-axis origin, between the C-axis origin and a second sensor contacting point of measurement on the second side of the C-axis value prescribed configuration; and
   determining the angle between said fiducial point of machining and the C-axis origin from said second and third angles measured and said first angle prescribed between the C-axis-value-prescribed configuration and the fiducial point of machining.

2. A method of searching for a fiducial point of machining in relation to the C-axis origin in a lathe applied to a workpiece having a C-axis-value prescribed configuration, said method comprising the steps of:
   activating different measurement programs in accordance with each case in which the C-axis-value-prescribed configuration is located on the outer circumference, end surface, or inside diametrical portion of the workpiece so that its position in relation to said fiducial point of machining is prescribed by a first angle;
   moving a sensor until it reaches a prescribed measuring point;
   rotating a workpiece until a first side of the C-axis value prescribed configuration contacts said sensor;
   measuring a second angle, facing the C-axis origin, between the C-axis origin and a first sensor contacting point of measurement on the first side of the C-axis-value prescribed configuration by using said measurement program in accordance with the location of the C-axis-value prescribed configuration;
   moving said sensor until it reaches a second prescribed measuring point;
   rotating the workpiece until a second side of the C-axis-value prescribed configuration contacts said sensor;
   measuring a third angle, facing the C-axis origin, between the C-axis origin and a second sensor contacting point of measurement on the second side of the C-axis-value prescribed configuration by using the measurement program in accordance with the location of the C-axis-value prescribed configuration; and
   determining the angle between said fiducial point of machining and the C-axis origin from said second and third angles measured and said first angle prescribed between the C-axis-value prescribed configuration and the fiducial point of machining.

3. A method of searching for a fiducial point of machining in relation to a C-axis origin in a lathe applied to a workpiece having a C-axis-value prescribed configuration whose C-axis value prescribed configuration position in relation to the fiducial point of machining is prescribed by a first angle, said method comprising the steps of:
   positioning a sensor;
   moving said sensor in the direction of the workpiece;
   retracting said sensor upon contact of the sensor with the workpiece C-axis-value prescribed configuration;
   rotating said workpiece about the C-axis by a given angle in a first direction subsequent to said retracting;
   repeating the step of moving the sensor in the direction of the workpiece;
   activating an alarm upon contact of the sensor with the C-axis-value prescribed configuration;
   rotating the workpiece about the C-axis in an opposite second direction;
   stopping rotation of the workpiece upon contact of a first side of the C-axis-value prescribed configuration with said sensor;
   activating an alarm upon completion of a predetermined amount of workpiece rotation without sensor contact;
   measuring a second angle between the C-axis origin and the sensor contacting point of measurement on the first side of the C-axis-value prescribed configuration;
   retracting said sensor;
   rotating the workpiece about the C-axis by a given angle in a second direction;
   moving said sensor in the direction of the workpiece;
   rotating the workpiece about the C-axis in a first direction;
   stopping rotation of the workpiece upon contact of a second side of the C-axis-value prescribed configuration with the sensor;
   measuring a third angle between the C-axis origin and the sensor contact point of measurement on the second side of the C-axis-value prescribed configuration;
   determining the angle between the fiducial point of machining and the C-axis origin from said second and third measured angles and said first angle prescribed between the C-axis-value prescribed configuration and the fiducial point of machining.

4. The method of searching for a fiducial point of machining as in claim 3, wherein said moving of the sensor in the direction of the workpiece is toward a prescribed measuring point.

5. The method of searching for a fiducial point of machining as in claim 3, wherein said predetermined amount of alarm activating workpiece rotation is 360°.

6. A method of searching for a fiducial point of machining as in claim 3, wherein said second and third angles are measured by the angle of rotation of a C-axis driving motor.

7. An apparatus for searching for a fiducial point of machining, of a workpiece having a C-axis-value prescribed configuration, in a lathe capable of carrying out machining by C-axis control based on the C-axis origin, comprising:

means for measuring second and third angles, facing the C-axis, between the C-axis origin and points of measurement located on first and second opposite sides of a C-axis-value prescribed configuration, including:

means for sensing contact with a workpiece;
    means for moving the sensing means; and
    means for rotating the workpiece about a C-axis;

means for storing a machining program relating to a workpiece having a C-axis-value prescribed configuration whose C-axis-value prescribed configuration position in relation to said fiducial point of machining is prescribed by a first angle; and means for determining an angle between the fiducial point of machining and the C-axis origin from the second and third angles measured by said angle measuring means and said first angle prescribed between the C-axis-value prescribed configuration and the fiducial point of machining.

8. An apparatus as in claim 7 wherein said means for rotating a workpiece includes a C-axis driving motor.

9. An apparatus as in claim 7 wherein said means for moving said sensing means can move said sensing means to a point for contacting a rotating workpiece at a second angle point of measurement on a first side of a workpiece C-axis-value prescribed configuration and said moving means can move said sensing means to a point for contacting a rotating workpiece at a third angle point of measurement on a second side of a workpiece C-axis value prescribed configuration.

10. An apparatus for searching for a fiducial point of machining, of a workpiece having a C-axis-value prescribed configuration, in a lathe capable of carrying out machining by C-axis control based on the C-axis origin, comprising:

means for storing a machining program relating to a workpiece having a C-axis-value prescribed configuration whose C-axis value prescribed configuration position in relation to the fiducial point of machining is prescribed by a first angle;

means for storing measurement programs in accordance with each case in which the C-axis-value prescribed configuration is located on the outer circumference, end surface, or inside diametrical portion of the workpiece;

means for selecting one of said measurement programs on the basis of measurement data prescribed in said machining program;

means for measuring, on the basis of said measurement program selected, second and third angles, facing the C-axis, between the C-axis origin and points of measurement located on first and second opposite sides of the C-axis-value prescribed configuration including:

means for sensing contact with a workpiece;
    means for moving the sensing means; and
    means for rotating the workpiece about a C-axis; and means for determining an angle between said fiducial point of machining and the C-axis origin from said second and third angles measured by said angle measuring means and said first angle prescribed between the C-axis-value prescribed configuration and said fiducial point of machining.

11. An apparatus as in claim 10 wherein said means for rotating a workpiece includes a C-axis driving motor.

12. An apparatus as in claim 10 wherein said means for moving said sensing means can move said sensing means to a point for contacting a rotating workpiece at a second angle point of measurement on a first side of a workpiece C-axis-value prescribed configuration and said moving means can move said sensing means to a point for contacting a rotating workpiece at a third angle point of measurement on a second side of a workpiece C-axis value prescribed configuration.

* * * * *